United States Patent [19]
Morrey

[11] 3,739,224
[45] June 12, 1973

[54] CRT - SWEEP RETURN CIRCUIT

[75] Inventor: Walter T. Morrey, Cambridge, Mass.
[73] Assignee: The Bendix Corporation, Southfield, Mich.
[22] Filed: Jan. 26, 1971
[21] Appl. No.: 109,881

[52] U.S. Cl. ............................................ 315/27 TD
[51] Int. Cl. ............................................ H01j 29/70
[58] Field of Search ........... 315/26, 27 TD, 27 GD, 315/28, 29

[56] References Cited
UNITED STATES PATENTS

| | | | |
|---|---|---|---|
| 3,195,009 | 7/1965 | Poorter | 315/27 R |
| 3,423,630 | 1/1969 | Beck | 315/27 TD |
| 3,395,313 | 7/1968 | Rogers | 315/27 TD |

*Primary Examiner*—Carl D. Quarforth
*Assistant Examiner*—J. M. Potenza
*Attorney*—Lester L. Hallacher and Plante, Hartz, Smith & Thompson

[57] ABSTRACT

A circuit for returning the sweep of a cathode ray tube to the initial horizontal position is described. Sweep voltages are applied to a transistor and directed to the yoke coil of the CRT through a linear high-voltage DC coil. The linear coil is in parallel with the yoke coil, and conduction of the transistor controls the sweep voltages to the yoke coil. As the transistor responds to the sweep voltages, the yoke coil voltage changes to control the spot sweep and return it to the initial position at the end of each sweep. A diode causes the circuit to discharge into the power supply to greatly increase the efficiency of the circuit.

10 Claims, 2 Drawing Figures

INVENTOR
WALTER T. MORREY

BY [signature]
ATTORNEY

CRT - SWEEP RETURN CIRCUIT

BACKGROUND OF THE INVENTION

All systems utilizing cathode ray tubes require a system for controlling the sweep of the spot across the face of the tube and also to return the spot to the initial position at the end of each horizontal sweep. The movement of the spot across the face of the tube is caused by energizing a yoke coil which generates a magnetic field to deflect the electron beam which results in the spot appearing on the face of the tube. After one sweep across the face of the tube is completed, it is necessary to return the spot to the beginning of the horizontal sweep so that a second sweep can be repeated. Ordinarily this is done by the use of a flyback transformer which changes the voltage on the yoke coil in a manner causing the spot to return to the original position in a very short period of time.

Any system employing a cathode ray tube requires a mechanism for accomplishing the movement of the spot from the end of a sweep to the beginning of the next sweep. Examples of such systems are home television systems and computer terminal systems, as well as other systems utilizing a visual display which includes a cathode ray tube. In many instances, the requirement for a flyback transformer and associated circuitry is not particularly detrimental, because there is a sufficient supply of energy and accordingly the efficiency of the system is not an important consideration. However, in some systems, particularly those which are portable, it is preferable to maximize the efficiency and also to reduce the complexity of the system. Accordingly, a CRT deflection scheme which eliminates the requirement for a flyback transformer and which simultaneously greatly improves the efficiency of the system would be a marked advance in the art.

SUMMARY OF THE INVENTION

The invention is directed to a system which overcomes the above disadvantages by the provision of a circuit which permits the control of the deflection voltages to a cathode ray tube and which permits the elimination of the flyback transformer ordinarily required in such systems. The invention is also advantageous because energy stored within the inventive circuit during the sweeping of the spot across the face of the tube is discharged into the power supply during the return of the spot to the initial position along the horizontal. The efficiency of the overall system is therefore greatly increased as compared to existing systems.

In the inventive circuit, the collector-emitter junction of a transistor is connected in series with a linear core coil. The deflection coil of the CRT is connected in parallel with the coil. A diode is connected in parallel with the serial connection of the transistor and coil, and the input sweep voltages are input to the base of the transistor. These voltages cause a current flow through the coil which, because of the presence of the diode, must also pass through the yoke coil, thereby controlling the deflection of the spot across the face of the CRT. When the sweep voltage goes to zero, thereby turning off the transistor, the current through the yoke coil reverses and rapidly discharges through the diode back into the power supply.

The inventive circuit has excellent linearity because a reverse current is never sustained by the emitting transistor. Power dissipation is reduced for the same reason.

DETAILED DESCRIPTION

Figure 1:
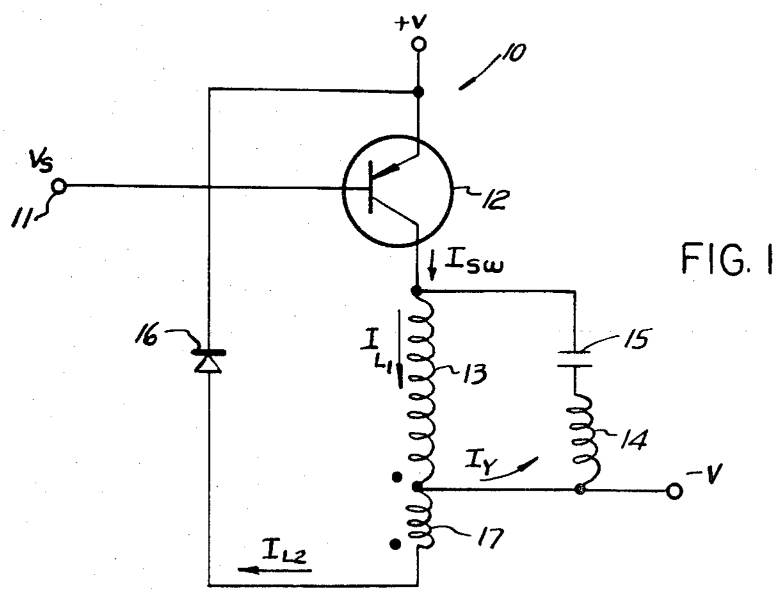
FIG. 1 shows a preferred embodiment of the inventive circuit.

The preferred embodiment of the inventive Circuit 10 shown in FIG. 1 includes a Transistor 12, the emitter of which is placed at a positive biasing potential +V. The collector of Transistor 12 is connected to a linear core high-current DC Coil 13. The Deflection Coil 14 of the CRT is connected in parallel with Coil 13. A Capacitor 15 is used to block DC signals from the Yoke Coil 14. Yoke Coil 14 is maintained at a negative biasing potential −V. A Diode 16 is connected from the emitter of Transistor 12 to the free end of Coil 17, which is wound on the same core as Coil 14. Diode 16 is poled so that it is reverse biased by the voltage across Coil 17.

Sweep voltages $V_s$ are applied to Input Terminal 11 which is connected to the base of Transistor 12. These signals are used to control the sweep of the spot across the CRT in known manner. The sweep signals applied to the base of Transistor 12 cause a current to flow through Coil 13. Because of Diode 16 the current flows through Yoke Coil 14, thereby establishing a magnetic field which controls the sweep of the spot across the face of the CRT. Current flows through Yoke Coil 14 because the circuit is not grounded. The nongrounding also is instrumental in causing Deflection Coil 14 to discharge back into the power supply, which provides the +V voltage. When Transistor 12 turns off because of a reduction in the voltage level of the sweep signals applied to the base, Yoke Coil 14 discharges more rapidly than Linear Choke 13 because Choke 13 has a greater inductance than Yoke 14. As an example, Coil 13 can have ten times the inductance of Yoke 14. When Transistor 12 turns off, the collector goes negative and Diode 16 clamps to the positive voltage supply, thereby setting the negative swing voltage on the collector of the transistor. Energy stored in Yoke Coil 14 then discharges through Diode 16 into power supply because current flow is reversed through the yoke coil. The energy stored in Yoke Coil 14 therefore is dumped back into the power supply instead of being discharged to ground as is done in many existing systems, thereby greatly increasing the overall efficiency of the inventive circuit. If desired, the stored energy can be discharged into some voltage other than the +V supply.

Figure 2:
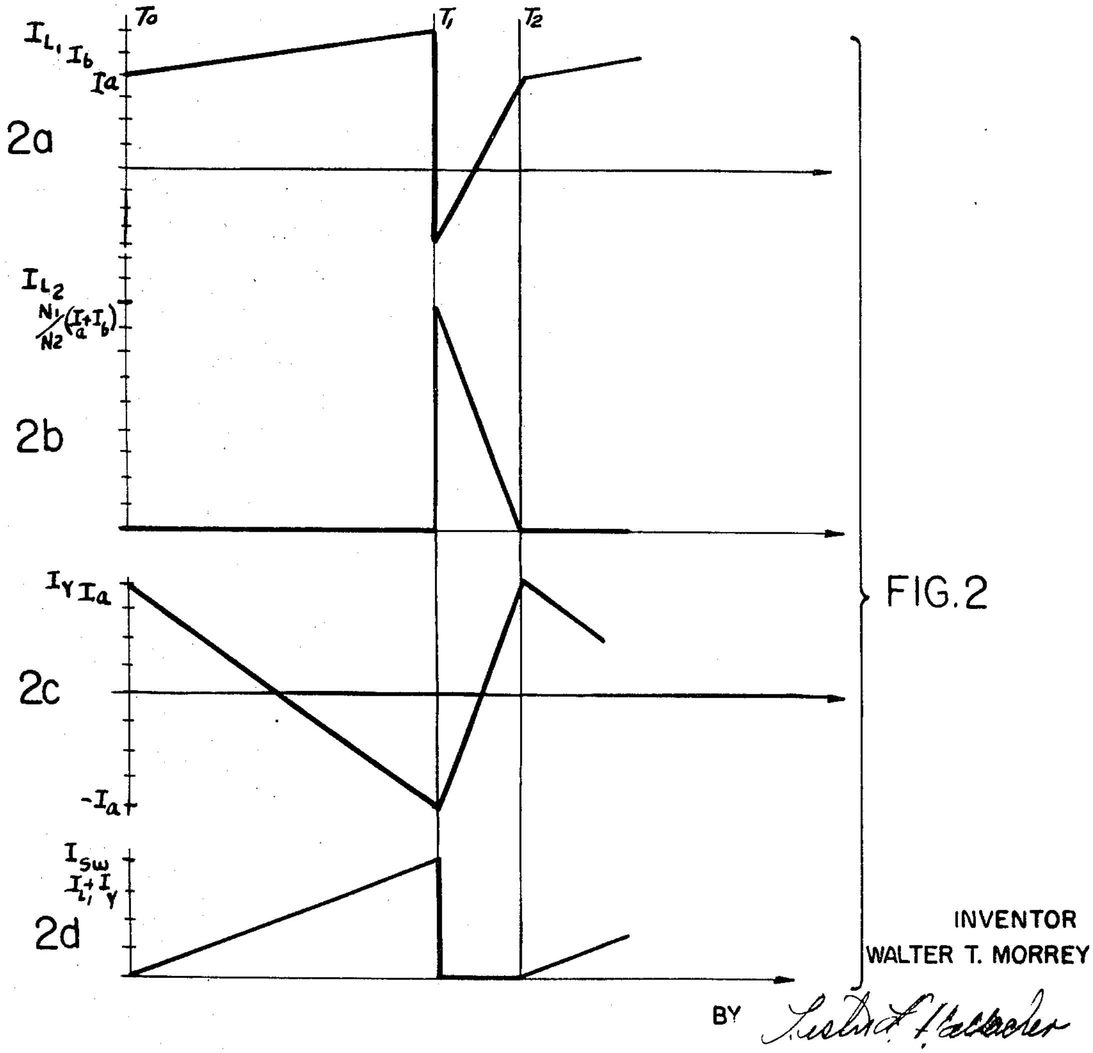
FIG. 2 shows current flow at various portions of the circuit at various times.

The currents shown flowing in the circuit of FIG. 1 and shown graphically in FIG. 2 are useful in understanding the operation of the system. At time $T_0$ a current $I_{L1}$ flows through Coil 13 in the direction shown. Current $I_{L1}$, shown in FIG. 2a, initially has a value of $I_a$ and gradually increases to a value of $I_b$ at time $T_1$, which is the end of the first horizontal sweep. At this time Current $I_{L1}$ reverses and energy is discharged from Coil 13 until the start of the next horizontal sweep at time $T_2$.

Because of Diode 16, and the lack of a ground connection, a current $I_Y$, shown in FIG. 2c, flows in Yoke Coil 14. This current increases from an initial value of $-I_a$ at time $T_0$ to a final value of $+I_a$ at time $T_1$. At time $T_1$ current $I_y$ reverses and rapidly discharges through Coil 17 and Diode 16. At time $T_2$ current $I_y$ again returns to $-I_a$ value and the cycle repeats. It should be noted that current $I_b$ is designated as negative because it initially flows out the junction of Coils 13, 14, and 17 while $I_{L1}$ flows into this junction.

Current $I_{L2}$ which flows through Coil 17 and Diode 16 is shown in FIG. 2b. This current is zero during the sweep time from $T_0$ to $T_1$ at which time it rapidly increases to value determined by the turns ratio of the coils and the sum of currents $I_a$ and $I_b$. At time $T_2$ current $I_{L2}$ is again zero, and it remains such until the discharge of Coils 13 and 14 at the end of the next horizontal sweep.

Current $I_{sw}$, shown in FIG. 2d, is the current flowing through Transistor 12. This current is the sum of currents $I_a$ and $I_b$ and therefore increase to a final value $I_a + I_b$ at time $T_1$. Current $I_{sw}$ is zero during the discharge time of Yoke Coil 14 between times $T_1$ and $T_2$.

It should be noted that, if desired, the AC voltages present across Coil 13 can be further utilized by the addition of another coil which is inductively coupled to the Coil 13. This could eliminate the necessity for at least one oscillator which is frequently used in existing television systems.

What is claimed is:

1. A deflection circuit for a cathode ray tube having a deflection coil for controlling the sweep of the spot across the face of said cathode ray tube in response to the reception of sweep signals comprising:

electron control means for receiving said sweep signals and providing a deflection current to said deflection coil, said electron control means having an on and an off conductive state;

means for receiving a biasing voltage from a supply and applying said biasing voltage to said electron control means;

inductive means coupled to said electron control means and receiving said deflection current; said deflection coil and said inductive means being connected to form a current loop so that said deflection current flows through said inductive means and said deflection coil; and unidirectional conductive means across said electron control means and said inductive means, said unidirectional conductive means having on and off conductive status and being poled so that said conductive states are opposite to the conductive status of said electron control means so that said deflection current flows through said current loop and said deflection coil receives said deflection current when electron control means is conductive and said deflection coil discharges through said unidirectional conductive means when said electron control means is non-conductive.

2. The circuit of claim 1 wherein said unidirectional conductive means is a diode, said diode being reverse biased when said electron control means is conductive.

3. The circuit of claim 2 wherein said electron control means is a transistor, said sweep voltages being applied to the base of said transistor and said biasing voltage being applied to the emitter of said transistor.

4. The circuit of claim 1 wherein said inductive means is a linear core coil, and said discharge through said diode is directed to said power supply.

5. The circuit of claim 4 wherein said linear core coil has approximately ten times as much inductance as said deflection coil.

6. The circuit of claim 1 wherein said electron control means is a transistor, said sweep voltages being applied to the base of said transistor and said biasing voltage being applied to the emitter of said transistor.

7. The circuit of claim 6 wherein said unidirectional conductive means is a diode, said diode being reverse biased when said electron control means is conductive.

8. The circuit of claim 7 wherein said inductive means is a linear core coil.

9. The circuit of claim 8 wherein said linear core coil has approximately ten times as much inductance as said deflection coil.

10. The circuit of claim 9 further including an additional coil inductively coupled to said linear core coil so that the voltage across said additional coil is dependent upon said sweep signals.

* * * * *